Oct. 26, 1965    V. COTMAN, JR    3,213,889
PIPE SUPPORT
Original Filed Oct. 13, 1960
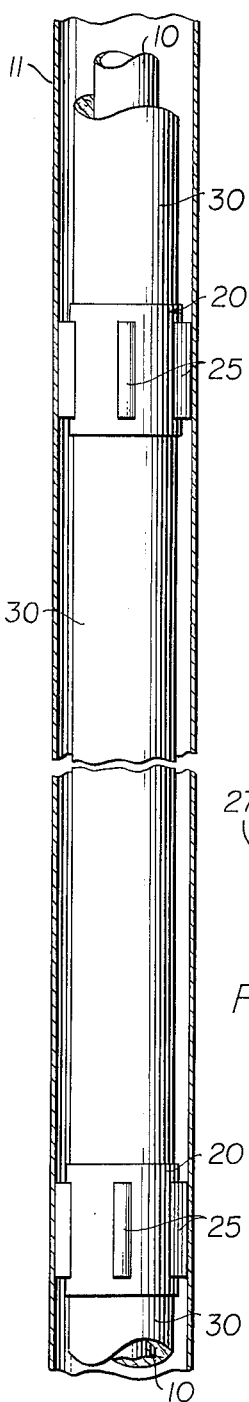
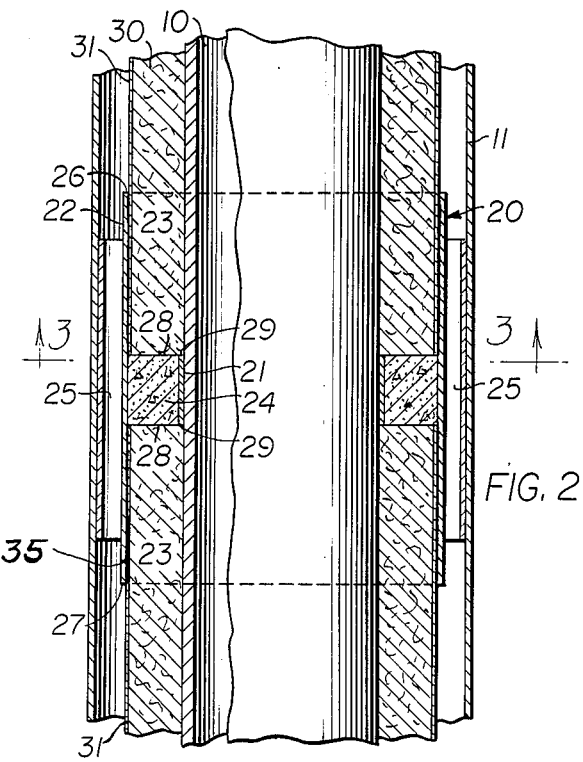
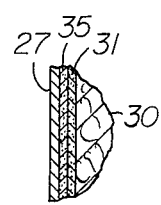
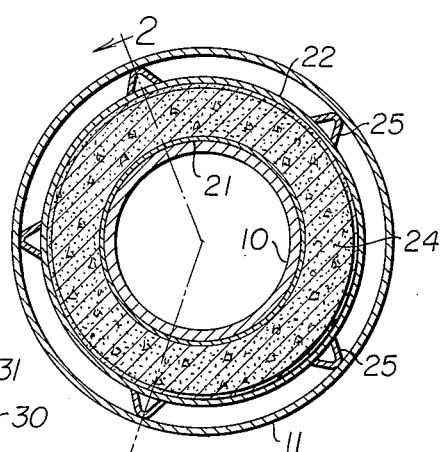
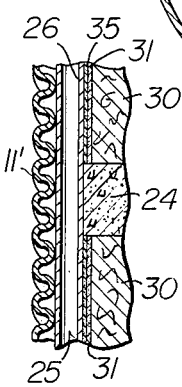
FIG. 1
FIG. 2
FIG. 3
FIG. 4
FIG. 5
INVENTOR.
VAL COTMAN, JR.
BY
for Watts, Edgerton, Pyle & Fisher
Attys.

United States Patent Office 3,213,889
Patented Oct. 26, 1965

3,213,889
PIPE SUPPORT
Val Cotman, Jr., North Olmsted, Ohio, assignor to Ric-Wil, Incorporated, Barberton, Ohio, a corporation of Ohio
Continuation of application Ser. No. 62,389, Oct. 13, 1960. This application Sept. 30, 1963, Ser. No. 315,419
4 Claims. (Cl. 138—113)

This application is a continuation of United States patent application Serial No. 62,389, filed October 13, 1960, by Val Cotman, Jr., for a pipe support, now abandoned in favor of this application.

This invention pertains to conduit systems and more particularly to improved insulation and pipe supports for maintaining pipes of conduit systems formed of prefabricated sections in spaced relationship with the outer casing.

In United States Patent No. 2,903,017, a pipe support for maintaining a pipe in spaced relationship with a surrounding casing is shown. According to the teachings of that patent, a plurality of supports are provided at spaced locations within the casing. Each of the supports has at least one aperture through it. A pipe projects through each such aperture and is held in spaced relationship with the casing by the supports. In the referenced patent, insulation tubes surround the pipe and extend from one support to the next.

In conduit systems of the type described in that patent, it is possible for atmospheric condensation to collect inside of the casing because control of temperatures and humidity within the casing would be costly and/or impossible. In "cold pipe" applications, atmospheric vapor coming in contact with the pipe will condense and form a liquid state on the pipe and inslulation surfaces. This collection of water is deleterious to the system both because it tends to induce corrosion and fill the air spaces in the insulating tubes, destroying the insulating properties of the tubes. With the present invention these disadvantages are overcome by providing an endless and hermetically sealed insulation surrounding the pipe, at the same time maintaining the pipe and insulation in a uniformly spaced relationship within the outer casing.

Accordingly, one of the principal objects of this invention is to provide a novel and improved conduit system in which the pipe insulation is hermetically sealed.

A related object of this invention is to provide a pipe with hermetically sealed insulation within and spaced from an outer casing.

Another principal object of this invention is to provide a pipe support for maintaining a pipe in spaced relationship with a surrounding casing which pipe support forms a part of the hermetically sealed insulation surrounding a pipe.

Still another object of this invention is to provide a conduit system including a plurality of pipe supports supporting an insulated pipe in spaced relationship from the outer casing in which the insulating material is hermetically sealed.

Expressed another way, a principal object of this invention is to provide a pipe insulation surrounding a pipe within a conduit system which insulation is sealed from deleterious vapors.

Yet another object of this invention is to provide a facilely assemblable pipe system which has insulation surrounding a pipe in which the insulation is hermetically sealed from deleterious moisture and which pipe system can be facilely inserted within an outer casing in a supported spaced relationship therefrom.

Other objects and a fuller understanding of the invention may be had by referring to the following description and claims taken in conjunction with the accompanying drawings in which:

FIGURE 1 is a sectional view of a unit length of a conduit system incorporating a novel and improved hermetic seal;

FIGURE 2 is a sectional view through one pipe support taken along the plane represented by line 2—2 of FIGURE 3;

FIGURE 3 is a sectional view taken along a plane represented by line 3—3 of FIGURE 2;

FIGURE 4 is a fragmentary sectional view showing an alternate form of casing; and, FIGURE 5 is an enlarged fragmentary sectional view of a portion of the support, a portion of the insulation, and the connection therebetween.

Referring now to the drawings, a fluid conducting pipe 10 is provided. The pipe 10 in the disclosed arrangement is disposed within and concentric to an outer casing 11. A plurality of annular pipe supports 20 are disposed within the casing 11. Each of the pipe supports 20 circumscribes the pipe 10 and maintains the pipe in a spaced supported relationship with respect to the casing 11. The supports 20 are spaced from one another, FIGURE 1, at predetermined intervals, and the portions of the pipe 10 between adjacent supports 20 have insulating tubes 30 telescoped over them. The insulating tubes 30 will be more fully described hereafter.

As best seen in FIGURES 2 and 3, each support 20 includes an inner endless rim 21 which circumscribes the pipe 10. The inner rim 21 is in supporting abutment with the pipe 10. An outer sleeve 22 is concentrically disposed about the inner rim 21. An annular ring of insulating pipe supporting filler material 24 is disposed between the inner rim 21 and the outer sleeve 22 to support the rim and sleeve in spaced apart and insulated relationship. The outer sleeve 22 is an elongated annular sleeve of substantially greater axial dimension than the inner rim and insulating ring 21, 24. The sleeve 22 has opposite ends 26, 27 which are spaced from opposite faces 28 of the supporting material 24 and flush faces 29 of the inner rim 21.

Annular insulation tubes 30 are provided which are annular sections of suitable insulating material such as fiber glass. The tubes 30 surround the pipe 10 and extend substantially from the face 28 of one ring of supporting material 24 to the face 28 of the next adjacent ring of supporting material 24. The sleeves 22 overlie the tubes with the outer spaced ends 26, 27 each disposed around one of the insulating tubes 30.

As was stated above, insulating tubes for insulating cold fluid-conducting pipes are rendered ineffectual when subjected or exposed to deleterious effects of moisture. To prevent moisture from coming in contact with the insulating tubes 30, the outer surface of the insulating tubes is coated at 31 with a suitable impervious sealing membrane, such as an asphalt coating, to prevent water from penetrating the insulating tubes 30. However, this will not prevent moisture from migrating between the sleeve at 23 and the insulating tubes 30, and then between each of the tubes and the faces 28 of the supporting material, eventually coming in contact with the pipe. To prevent moisture contact with the pipe, the tubes are hermetically sealed within the outer sleeves at 23 by placing a quantity of sealing compound between the inside surface of each outer sleeve 22 and the outer coating 31 of each contiguous insulating tube 30 prior to inserting the tubes into the sleeves. This sealing compound is shown in an exaggerated form by the cross sectioning and stippling at 35 in FIGURES 4 and 5. Each such quantity of sealing compound is completely around the tube 30 to form a hermetic seal between the tubes and the sleeve. In this manner an endless hermetic seal is provided which will prevent any moisture from coming into contact with the pipe 10.

In order to provide uniform spacing between the insulating tubes 30 and the outer casing 11, each of the annular supports 20 has a plurality of leg supports 25 circumferentially disposed about the outer sleeve 22. A plurality of the leg supports 25 are in substantial line contact with the outer casing 11 to support the pipe and insulation in the casing.

The leg supports 25 preferably are elongated thin metal strips of inverted V-shapes. The ends of the legs of the V's are affixed to the outer sleeve 22 with the point of each of the V's being positioned to abut the casing 11 in substantial line contact. This configuration provides a maximum amount of added insulating air space between the outer casing 11 and the outer sleeve 22.

By making the leg supports 25 of sufficient length, it is possible to use the pipe supports 20 in circumferentially or spirally corrugated outer casings. This is shown in FIGURE 4 when a spirally corrugated conduit is designated by the numeral 11'. By making the leg supports 25 long enough to bridge between a plurality of adjacent, inwardly directed corrugations of the casing, spaced point contacts are provided. A firm support is afforded in such corrugated outer casing irrespective of the placement of the pipe supports with respect to the corrugations. Thus, a pipe support is provided which is adapted to be used in either a smooth walled, outer casing or a corrugated outer casing.

While the invention has been described with a great deal of detail, it is believed it essentially comprises an improved pipe support which will hold a pipe spaced from a casing and also provide an imperforate connection between two spaced and sealed insulation tubes.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:
1. A conduit system comprising:
   (a) a pipe;
   (b) a casing around the pipe;
   (c) a plurality of support assemblies surrounding the pipe and interposed between the pipe and the casing to maintain the two in spaced relationship;
   (d) a plurality of tubes of crushable insulation around the pipe, each of said tubes extending from one assembly to an adjacent assembly, each of said tubes including a fluid impervious layer extending substantially from one of its ends to the other of its ends;
   (e) each of said support assemblies including a portion of supporting material between the ends of adjacent tubes of insulation in surrounding contacting engagement with said pipe and extending radially outwardly of said pipe a distance at least equal to the thickness of said adjacent tubes;
   (f) said support assemblies each including first and second annular portions extending longitudinally in opposite directions from the center thereof, one of said annular portions being around an end portion of one of said tubes, and the other of said annular portions being around the adjacent end portion of the other of said tubes;
   (g) a plurality of moisture impervious bonding means respectively effecting circumferentially endless bonds between the layer on each tube end portion and the assembly portion therearound;
   (h) each of said support assemblies providing between said first and second annular portions an imperforate tubular fluid barrier extending from the endless bond effected with one of its annular portions to the endless bond effected with the other of its annular portions; and,
   (i) said assemblies, said layers, and said bond means together providing a continuous hermetic layer to prevent fluid condensation on the pipe and maintain the insulation in a dry condition.

2. The conduit system as claimed in claim 1 wherein said first and second annular portions of each support assembly and said tubular fluid barrier provided between said annular portions comprise an annular imperforate support sleeve; and wherein said portion of each support assembly in surrounding supporting engagement with said pipe comprises a ring of filling and insulating material disposed within and secured to said support sleeve and spaced from each of its ends.

3. The conduit system as claimed in claim 2 wherein each of said support assemblies further includes leg means in abutting engagement between said casing and support sleeve of the support assembly to maintain said support sleeve in supported spaced relationship with said casing, said leg means defining longitudinally extending air passages to permit the circulation of air between said casing and said insulation tubes from one side of each support assembly through to its other side.

4. The conduit system as claimed in claim 3 wherein said leg means of each support assembly comprises a plurality of elongated, thin metal members of V-shaped cross-section, the ends of each such V member being fixed to the support sleeve to define an insulating space between that member and said sleeve, and the points of said V members providing elongated line support edges parallel to the axis of the support assembly and abutting the surrounding portion of said casing at spaced lines of contact.

References Cited by the Examiner

UNITED STATES PATENTS

| | | | |
|---|---|---|---|
| 1,948,007 | 2/34 | Putnam | 138—144 |
| 2,761,949 | 9/56 | Colton | 138—149 X |
| 2,857,931 | 10/58 | Lawton | 138—149 X |
| 2,903,017 | 9/59 | Cotman | 138—113 |
| 2,930,407 | 3/60 | Conley et al. | 138—149 X |
| 2,938,569 | 5/60 | Goodrich | 138—109 |

LEWIS J. LENNY, *Primary Examiner.*